US009656873B2

(12) United States Patent
Mehrotra et al.

(10) Patent No.: US 9,656,873 B2
(45) Date of Patent: May 23, 2017

(54) PURIFICATION OF TUNGSTEN CARBIDE COMPOSITIONS

(71) Applicant: Kennametal Inc., Latrobe, PA (US)

(72) Inventors: Pankaj Kumar Mehrotra, Greensburg, PA (US); Mark S. Greenfield, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 315 days.

(21) Appl. No.: 14/549,124

(22) Filed: Nov. 20, 2014

(65) Prior Publication Data

US 2015/0139872 A1 May 21, 2015

Related U.S. Application Data

(60) Provisional application No. 61/907,267, filed on Nov. 21, 2013.

(51) Int. Cl.
*C01B 31/34* (2006.01)

(52) U.S. Cl.
CPC .................................. *C01B 31/34* (2013.01)

(58) Field of Classification Search
CPC ....................................................... C01B 31/34
See application file for complete search history.

(56) References Cited

U.S. PATENT DOCUMENTS

| 1,726,236 | A | 8/1929 | Parker |
| 2,020,117 | A | 11/1935 | Johnston |
| 2,872,394 | A | 2/1959 | Newnam |
| 3,595,484 | A | 7/1971 | Barnard et al. |
| 3,669,850 | A | 6/1972 | Draca |
| 3,785,938 | A | 1/1974 | Sam |
| 3,887,680 | A | 6/1975 | MacInnis et al. |
| 4,092,400 | A | 5/1978 | Zbranek et al. |
| 4,128,463 | A | 12/1978 | Formanik |
| 4,140,597 | A | 2/1979 | Kobayakawa |
| 4,170,513 | A | 10/1979 | Piche |
| 4,234,333 | A | 11/1980 | Ghandehari et al. |
| 4,256,708 | A | 3/1981 | Quatrini |
| 4,385,972 | A | 5/1983 | Vanderpool |
| 5,021,133 | A | 6/1991 | Vanderpool et al. |

(Continued)

FOREIGN PATENT DOCUMENTS

| DE | 151333 A1 | 10/1981 |
| EP | 0005877 A2 | 12/1979 |

(Continued)

OTHER PUBLICATIONS

International Search Report for PCT/US2014/066620 filed Nov. 20, 2014, 3 pages, mailed Mar. 5, 2015.

(Continued)

*Primary Examiner* — Arun S Phasge
(74) *Attorney, Agent, or Firm* — Larry R. Meenan

(57) ABSTRACT

In one aspect, methods of purifying WC compositions are described herein. A method of purifying a WC composition comprises contacting the WC composition with an electrolyte solution comprising a cationic metal oxidant and oxidizing one or more metal impurities of the WC composition with the cationic metal oxidant to solubilize the one or more metal impurities in the electrolyte solution.

24 Claims, 3 Drawing Sheets

(56) References Cited

U.S. PATENT DOCUMENTS

| | | | |
|---|---|---|---|
| 5,384,016 A * | 1/1995 | Lin | ............... C01B 31/34 |
| | | | 205/478 |
| 5,728,197 A | 3/1998 | Seegopaul et al. | |
| 2004/0109812 A1 | 6/2004 | Eckhart et al. | |

FOREIGN PATENT DOCUMENTS

| | | |
|---|---|---|
| EP | 0830313 B1 | 11/2001 |
| EP | 1828442 B1 | 5/2007 |
| KR | 100680925 B1 | 2/2007 |
| RU | 2165885 C1 | 4/2001 |
| SE | 165128 C | 10/1958 |
| WO | 8605475 A1 | 9/1986 |
| WO | 9640586 A1 | 12/1996 |
| WO | 0202848 A2 | 1/2002 |
| WO | 2004/106592 A1 | 12/2004 |
| WO | 2011083376 A1 | 7/2011 |

OTHER PUBLICATIONS

May 24, 2016—International Preliminary Report & Written Opinion.

Been J. et al., "Electrochemical regeneration of ceric sulphate in an undivided cell", Journal of Applied Electrochemistry 23 (1993) pp. 1301-1309.

Costigan, Dr. M. et al., "Vanadium Pentoxide and Other Inorganic Vanadium Compounds", Concise International Chemical Assessment Document 29, World Health Organization, Geneva, 2001, 59 pages.

Gürmen, S. et al., "Recovery of Cobalt Powder and Tungsten Carbide from Cemented Carbide Scrap—Part I: Kinetics of Cobalt Acid Leaching", 2008, 9 pages.

Harnisch et al., "Electrocatalytic and corrosion behaviour of tungsten carbide in near-neutral pH electrolytes", Elsevier, Applied Catalysis B: Environmental 87 (2009) pp. 63-69.

Pakalapati, S.N.R. et al., "Anodic Oxidation of Ethylenediaminetetraacetic Acid on Platinum Electrode in Alkaline Medium", University of South Carolina School Commons, Department of Chemical Engineering, Journal of the Electrochemical Society, 1996, cover plus pp. 1636-1643.

Shedd, K., "Tungsten Recycling in the United States in 2000", U.S. Geological Survey Circular 1196-R, Reston, Virginia 2011, U.S. Department of the Interior, Flow Studies for Recycling Metal Commodities in the United States, 24 pages.

Vijayabarathi, T. et al., "A Comparative Study of Two Stage Electrochemical Oxidation of Toluene, P-Ethoxy Toluene, O-Chlorotoluene and P-Isopropyl Toluene Using Ce4+/Ce3+ Redox System in Methane Sulphonic Acid Medium", Bulletin of Electrochemistry, 18 (2) Feb. 2002, pp. 49-56.

Wikipedia, "Standard electrode potential (data page)", http://en.wikipedia.org/wiki/Standard_electrode_potential_(data_page), Retrieved Jan. 29, 2015, 16 pages.

Raju, T. et al., "Electrochemical cell design and development for mediated electrochemical oxidation-Ce(III)/Cd(IV) system", Chemical Engineering Journal 114 (2005) pp. 55-65.

Tzedakis, T. et al., "Electrochemical regeneration of Ce(IV) for oxidation of p-methoxytoluene", Journal of Applied Electrochemistry 27 (1997) 589-597.

Swedish Search Report, issued in corresponding Swedish Application No. 1650494-6 mailed Jan. 27, 2017.

Office Action issued in corresponding Swedish Application No. 1650494-6 dated Jan. 27, 2017.

* cited by examiner

PURIFICATION OF TUNGSTEN CARBIDE COMPOSITIONS

RELATED APPLICATION DATA

The present application claims priority pursuant to 35 U.S.C. §119(e) to U.S. Provisional Patent Application Ser. No. 61/907,267 filed Nov. 21, 2013 which is incorporated herein by reference in its entirety.

FIELD

The present invention relates to methods of purifying tungsten carbide compositions and, in particular, to methods of purifying cemented tungsten carbides in tungsten recycling operations.

BACKGROUND

Tungsten is an industrially significant metal finding application in a variety of fields with particular emphasis in the tooling industry. The high hardness, heat resistance and wear resistance of tungsten and its carbide form make it an ideal candidate for use in cutting tools, mining and civil engineering tools and forming tools, such as molds and punches. Cemented tungsten carbide tools, for example, account for the majority of worldwide tungsten consumption. According a 2007 United States Geological Survey, mineral deposits of tungsten resources totaled in the neighborhood of nearly 3 million tons. At current production levels, these resources will face exhaustion within the next forty years. Moreover, a handful of nations control the majority of worldwide tungsten deposits. China, for example, controls approximately 62% of tungsten deposits and accounts for 85% of ore production volume.

Given the limited supply of tungsten and its inequitable global distribution, significant resources have been invested in the development of processes for recycling scrap tungsten carbide compositions. For example, hydrometallurgy tungsten recycling processes have been developed where tungsten carbide scrap is roasted with molten sodium nitrate ($NaNO_3$) to generate water soluble $Na_2WO_4$. The $Na_2SO_4$ undergoes conversion to several different chemical species ending in an aqueous solution of $(NH_4)_2SO_4$. Ammonium paratungstate can be easily converted to tungsten oxide ($WO_3$) by roasting and subsequently carburized to tungsten carbide (WC). This recycling process, however, demonstrates several disadvantages including numerous processing steps, high chemical consumption and high energy consumption. Therefore, profitability is limited until large scale production is achieved.

An alternative process for recycling WC scrap employs molten zinc metal. In this process, cemented carbide scrap is mixed with zinc ingots in a tray, and the mixture is heated in a furnace to liquefy the zinc. The liquefied zinc permeates the WC scrap reacting with the metallic binder phase. The zinc is subsequently volatilized leaving behind a porous WC that is crushed into powder form. This zinc treatment process also suffers from significant disadvantages. Liquefication of the zinc, for example, requires high energy consumption. More troubling, however, is the dirty state of the resulting porous WC. Zinc treatment does not remove impurities in the WC composition such as metal carbide grain growth inhibitors and metallic binder. Such impurities limit use of the recycled WC composition in the fabrication of new tooling.

SUMMARY

In one aspect, methods of purifying WC compositions are described herein. A method of purifying a WC composition comprises contacting the WC composition with an electrolyte solution comprising a cationic metal oxidant and oxidizing one or more metal impurities of the WC composition with the cationic metal oxidant to solubilize the one or more metal impurities in the electrolyte solution. For example, an oxidized metal impurity solubilized in the electrolyte solution can be a grain growth inhibitor of WC. Further, an oxidized metal impurity may be metallic binder of a cemented WC composition. The WC composition is separated from the electrolyte solution containing the solubilized impurities to provide a purified WC composition. Further, the electrolyte solution comprising the solubilized metal impurities can undergo processing to capture the metal impurities.

Additionally, the reduced cationic metal oxidant can be oxidized by an anode for continued use of the oxidant in the oxidation of metal impurities remaining in the WC composition. Oxidation of the reduced oxidant can permit recycling of the oxidant in the WC purification process. In some embodiments, for example, the anode is positioned in a vessel separate from the WC composition and electrolyte solution comprising the reduced cationic metal oxidant is transferred to the vessel for oxidation of the reduced oxidant. The metal cationic oxidant is subsequently returned to the WC composition for continued oxidation of remaining metal impurities.

These and other embodiments are described in greater detail in the detailed description which follows.

DETAILED DESCRIPTION

Figure 1:
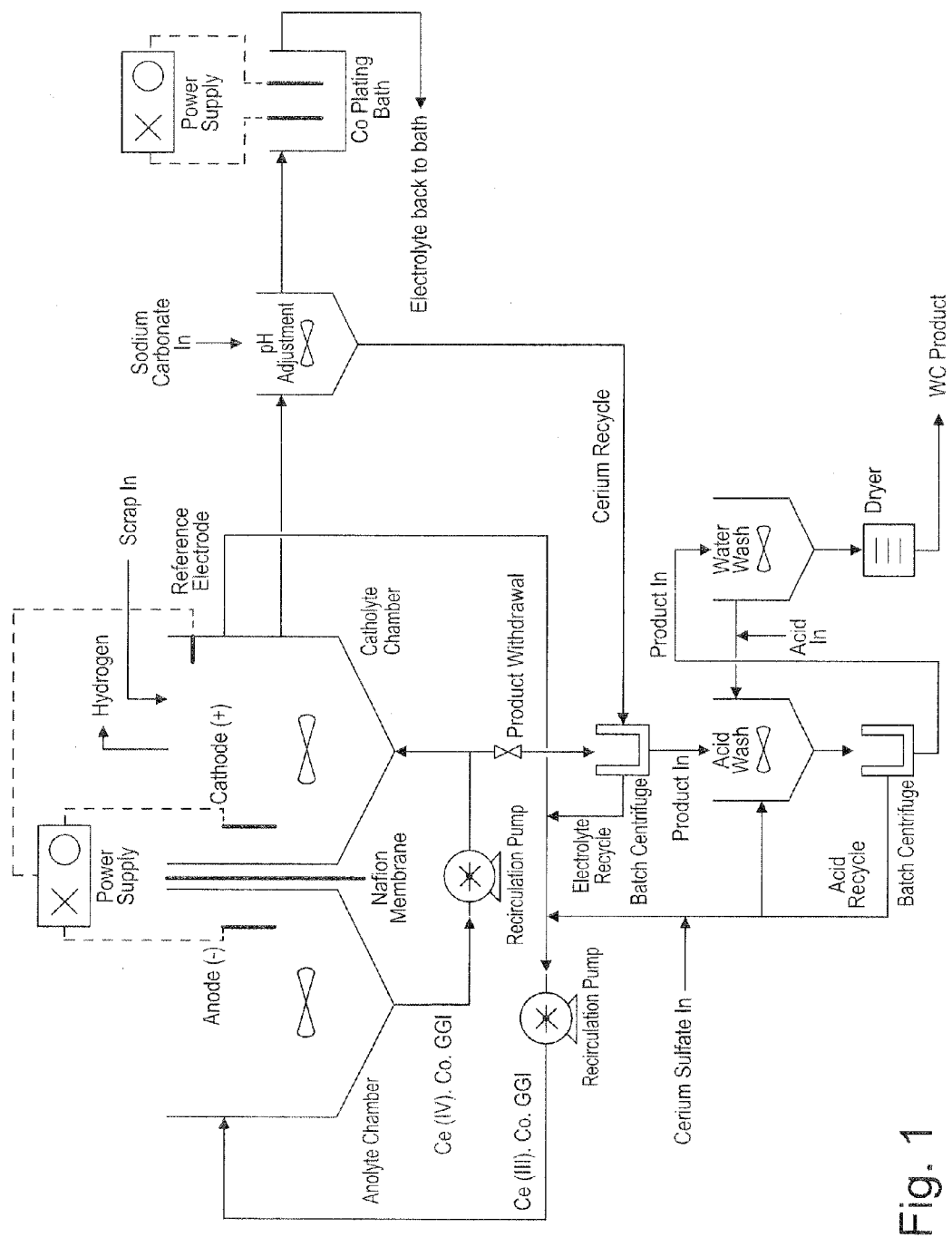
FIG. 1 illustrates a method and system employing cerium (IV) as the cationic metal oxidant in the purification of a WC composition according to one embodiment described herein.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

Methods of purifying WC compositions are described herein which, in some embodiments, enable efficiencies in WC recycling operations. For example, purification methods described herein can remove metal impurities from the WC composition such as grain growth inhibitors and/or metallic binder(s) without significantly stripping tungsten. Therefore, a highly purified WC material results, suitable for use in the construction of new tooling.

A method of purifying a WC composition described herein comprises contacting the WC composition with an electrolyte solution comprising a cationic metal oxidant and oxidizing one or more metal impurities of the WC composition with the cationic metal oxidant to solubilize the metal impurities in the electrolyte solution. Metal impurities oxidized by the cationic metal can be selected from the group consisting of metallic elements of Groups IVB-VIIIB of the Periodic Table. For example, one or more metal impurities of the WC composition can be selected from the group consisting of titanium, vanadium, zirconium, hafnium, niobium, tantalum, chromium, cobalt, nickel and iron. Such metal impurities can be in present in the WC composition as metal carbides. When present as carbides, the metal impurities can be grain growth inhibitors of WC. Alternatively, a metal impurity can be present in metallic form as a binder, such as in cemented WC. In some embodiments, cobalt, iron and/or nickel are impurities present in the WC composition as metallic binder.

WC compositions having one or more metal impurities and suitable for use with methods described herein can be obtained from various sources. In some embodiments, WC compositions are scrap WC from various tooling applications such as cutting inserts, end mills, forming tools and/or mining tools. Scrap WC from tooling applications will often be cemented WC. However, binderless and/or polycrystalline WC incorporating grain growth inhibitors can find application in methods described herein. Further, WC compositions can be subjected to various treatments prior to purification according to methods described herein. In some embodiments, for example, scrap WC is subjected to the zinc process described above prior to purification.

An electrolyte solution comprising a cationic metal oxidant is provided for contacting the WC composition and oxidizing one or more of the metal impurities to solubilize the metal impurities in the electrolyte solution. Any cationic metal operable to oxidize a metal impurity of the WC composition can be used. In some embodiments, a cationic metal oxidant comprises a transition metal cation. Suitable transition metal cations can comprise first row transition metals in the (II) or (III) oxidation state, such as cobalt (III) [$Co^{+3}$]. Alternatively, a cationic metal oxidant can comprise a lanthanide series element in the (III) or (IV) oxidation state, such as cerium (IV) [$Ce^{+4}$]. Additionally, a cationic metal oxidant is not limited to a single metal species. A cationic metal oxidant, in some embodiments, comprises a plurality of cationic metals for oxidizing metal impurities of the WC composition. Cationic metals, for example, can be selected according to the ability to oxidize various metal impurities of the WC composition.

Cationic metal oxidant can be provided to a solvent as an ionic solid for solubilization by the solvent. Solubilization of the cationic metal oxidant, in some embodiments, provides the electrolyte solution for contacting the WC composition. Solvents suitable for use in producing the electrolyte solution should sufficiently solubilize the cationic metal oxidant without reducing the cationic metal oxidant. Alternatively, the cationic metal oxidant is added to an existing electrolyte solution and solubilized by the electrolyte solution. For example, the cationic metal oxidant can be added to an acid solution such as a sulfuric acid solution, alkane-sulfonic acid solution or nitric acid solution for solubilization. Electrolyte solutions sufficiently solubilizing the cationic metal oxidant should not reduce the cationic metal oxidant. Further, temperature and/or pH of the electrolyte solution including the cationic metal oxidant can be adjusted to enhance solubility of the cationic metal oxidant in one or more oxidation states.

Preferably, the electrolyte solution solubilizes the cationic metal oxidant in each oxidation state encountered in the purification process. The electrolyte solution, for example, can sufficiently solubilize cerium in the IV and III oxidation states.

The WC composition is contacted with the electrolyte solution and one or more metal impurities are oxidized by the cationic metal oxidant and solubilized in the electrolyte solution. Depending on the chemical identity of the cationic metal oxidant, oxidation of metal impurities can be achieved at room temperature or elevated temperature. Advantageously, oxidation and solubilization of metal impurities can be achieved without substantially stripping tungsten from the WC composition. Therefore, a purified WC composition is directly provided by methods described herein. In some embodiments, the resulting WC composition has a purity selected from Table I.

TABLE I

| % WC of purified WC Composition |
| --- |
| ≥90 |
| ≥93 |
| ≥95 |
| ≥98 |
| 90-99 |
| 95-99 |
| 95-99.9 |

Providing a purified WC composition is a marked departure from previous tungsten recycling methods where tungsten is stripped from the scrap and ultimately collected as an oxide, such as $WO_3$. Such methods, therefore, require the additional step of carburizing the tungsten prior to use in new tooling. These additional steps are obviated by methods described herein where the purified WC material is recovered in suitable form for the production of tooling bodies.

Oxidation of one or more metal impurities by the cationic metal oxidant can be achieved in the absence of an external electrode. In some embodiments, for example, an electrode is not present in the vessel containing the WC composition and electrolyte solution of cationic metal oxidant. Oxidation of metal impurities with a cationic metal oxidant differentiates prior electrolytic methods of tungsten recycling where anodes and/or cathodes are employed for the oxidation and/or reduction of impurity species. In some embodiments, an electrode can be present in the vessel containing the WC composition. Such an electrode, however, does not participate in the oxidation of metal impurities in the WC composition. In some embodiments, for example, the electrode is a cathode for reducing excess cationic metal oxidant in the electrolyte solution. Alternatively, the electrode can be an anode for generating cationic metal oxidant in the electrolyte solution. In one embodiment, for example, cobalt (II) can be present in the electrolyte solution. An anode can be used to oxidize the cobalt (II) to cobalt (III), where the cobalt (III) is operable for oxidation of metal impurities of the WC composition.

Additionally, the reduced cationic metal oxidant can be oxidized by an anode for continued use of the oxidant in the oxidation of metal impurities remaining in the WC composition. Oxidation of the reduced oxidant can permit recycling of the oxidant in the WC purification process. In some embodiments, for example, the anode is positioned in a vessel separate from the WC composition and electrolyte solution comprising the reduced cationic metal oxidant is transferred to the vessel for oxidation of the reduced oxidant.

The metal cationic oxidant is subsequently returned to the WC composition for continued oxidation of remaining metal impurities.

After sufficient oxidation and leaching, the WC composition is separated from the electrolyte solution and can undergo one or more washing steps to remove any residual species of the electrolyte solution. In some embodiments, for example, the WC composition is washed with fresh acid to remove any cationic metal oxidant and/or metal impurities. Water washing can follow the acid wash to provide the purified WC product. Further, the electrolyte solution comprising the solubilized metal impurities can be processed to capture the impurities. Solubilized metal impurities can be captured by a variety of separation techniques including plating, phase extraction, ion exchange or combinations thereof. As described herein, a solubilized metal impurity can be cobalt. In such embodiments, cobalt can be plated and recovered from the electrolyte solution. The electrolyte solution containing cobalt, for example, can be transferred to a plating vessel comprising one or more electrodes for plating the cobalt. In addition to metal impurities, cationic metal oxidant can be recovered from the electrolyte solution. Cationic metal oxidant, in some embodiments, is recovered by precipitating the metal oxidant from the electrolyte solution. Temperature and/or pH of the electrolyte solution can be adjusted to precipitate cationic metal oxidant. In other embodiments, cationic metal oxidant can be removed from the electrolyte solution by electrochemical means.

The following cerium mediated and cobalt mediated purification systems illustrate non-limiting embodiments of the foregoing WC purification methods.

I. Cerium Mediated WC Purification System

FIG. 1 illustrates a method and system employing cerium (IV) as the cationic metal oxidant in the purification of a WC composition according to one embodiment described herein. As illustrated in FIG. 1, the purification system comprises a divided cell separated by a NAFION® membrane. The WC composition, such as a powdered WC scrap from the zinc process, is placed in the cathode compartment and electrolyte solution comprising cerium (IV) as the cationic metal oxidant is added to the cathode compartment. In some embodiments, the electrolyte solution comprises sulfuric acid or alkyl-sulfonic acid, such as methane sulfonic acid, for sufficiently solubilizing cerium (IV). Cerium (IV) can be added to the electrolyte solution as ceric sulfate.

Contacting the WC composition with the electrolyte solution permits the cationic cerium oxidant to oxidize one or more metal impurities of the WC composition. The cationic cerium oxidant, in some embodiments, oxidizes grain growth inhibitors (GGI) of the WC composition including vanadium, tantalum, niobium and/or chromium. Oxidation of the metal impurities is conducted at room temperature to maintain the solubility of the cationic cerium oxidant. Cerium sulfate exhibits reduced solubility with increasing temperature. The cathode in contact with the electrolyte solution can be employed to reduce excess cerium oxidant to cerium (III). In the embodiment of FIG. 1, the cathode is not in contact with the WC composition.

Portions of electrolyte solution are removed from the top of the cathode compartment and transferred to the anode compartment. Removal and transfer of electrolyte portions can be achieved with suitable pumping apparatus. In the anode compartment, the electrolyte solution is mixed or flowed past the anode in a turbulent regime to promote efficient kinetics. The anode will oxide the reduced cerium (III) to cerium (IV), thereby regenerating the cerium oxidant. Voltage of the anode compartment can be set to oxidize the cerium but not cobalt in the electrolyte solution. Electrolyte of the anode compartment can be returned to the cathode compartment for continued oxidation of metal impurities in the WC composition. After sufficient oxidation and leaching of the metal impurities, the WC composition is removed from the cathode compartment and is subjected to a sulfuric acid wash to remove cerium oxidant and any oxidized metal impurities. Sulfuric acid used in the wash can be recycled to the cathode and/or anode compartment. The WC composition is subsequently water washed and dried to provide the purified WC product. In some embodiments, the WC product has a purity selected from Table I herein.

Electrolyte comprising cerium oxidant and solubilized metal impurities is collected and subjected to various separation techniques. The electrolyte solution, for example, can be transferred to a vessel where the pH of the electrolyte solution is adjusted to fall in the range of 2-3 causing precipitation of a significant portion of the cerium oxidant. Sodium carbonate can be used for the pH adjustment. The cerium precipitate undergoes sedimentation and is collected for use in another WC purification batch. The electrolyte solution is transferred to an electrolytic cell where cobalt is plated out and collected. The remaining metal impurities of the electrolyte solution can be extracted by various separation techniques.

II. Cobalt Mediated WC Purification System

Figure 2:
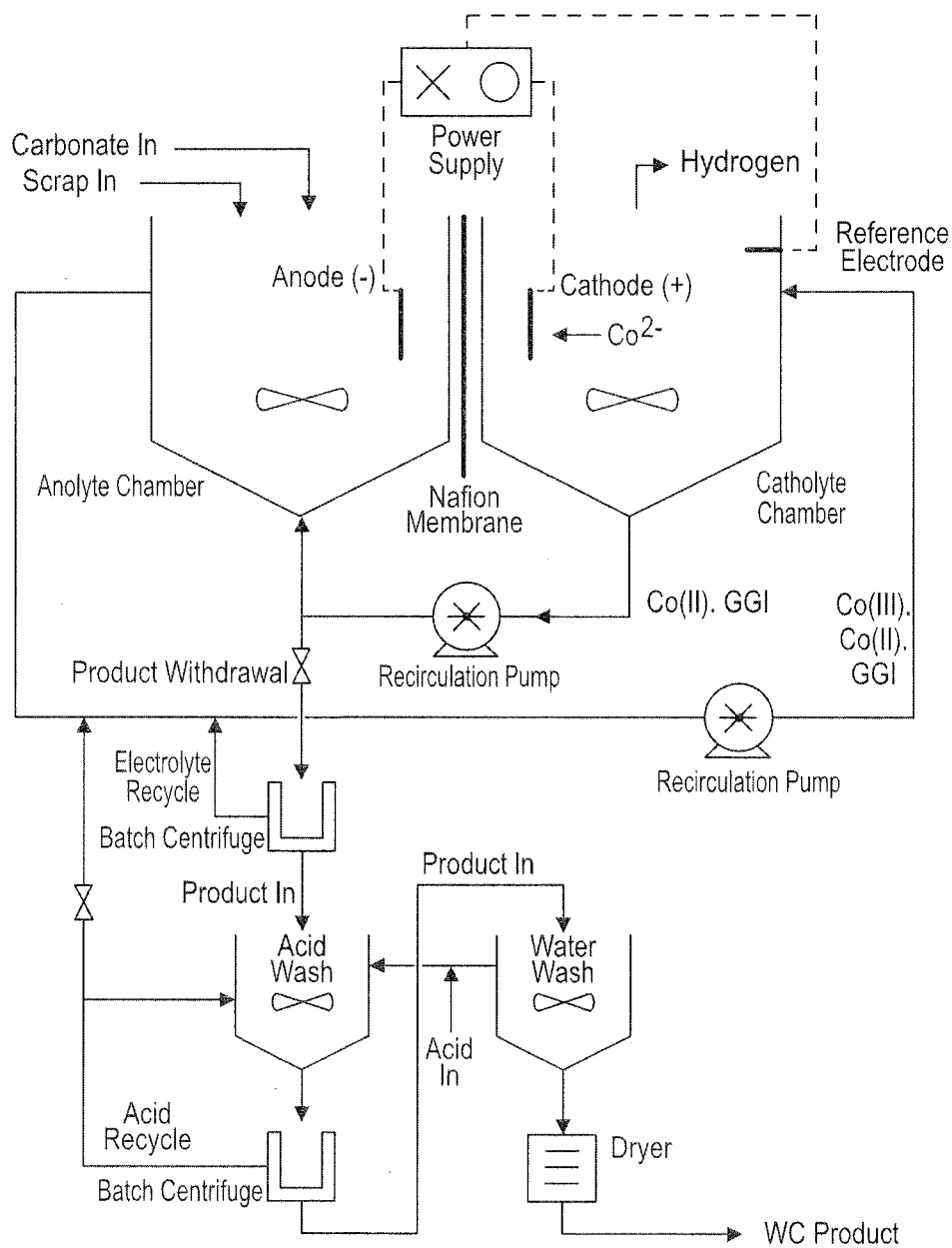
FIG. 2 illustrates a method and system employing cobalt (III) as the cationic metal oxidant in the purification of a WC composition according to one embodiment described herein.

FIG. 2 illustrates a method and system employing cobalt (III) as the cationic metal oxidant in the purification of a WC composition according to one embodiment described herein. Similar to the cerium mediated system, the cobalt mediated system employs a divided cell separated by a NAFION® membrane. However, in the cobalt mediated system, the WC composition is placed in the anode compartment. Electrolyte solution comprising cationic cobalt oxidant is added to the anode compartment to contact the WC composition. In some embodiments, the cobalt oxidant is added to the anode compartment in the (III) oxidation state suitable for oxidizing metal impurities of the WC composition. Alternatively, the cobalt oxidant can be added in the (II) oxidation state and oxidized by the anode to the (III) oxidation state.

Contacting the WC composition with the electrolyte solution permits the cationic cobalt oxidant to oxidize one or more metal impurities of the WC composition. The cationic cobalt oxidant, in some embodiments, oxidizes GGI of the WC composition including vanadium, tantalum, niobium and/or chromium. Oxidation of the metal impurities can be conducted at room temperature or elevated temperature. The anode in contact with the electrolyte solution can be employed to oxidize cobalt (II) in the electrolyte solution, thereby providing a steady supply of cobalt (III) oxidant. In the embodiment of FIG. 2, the anode is not in contact with the WC composition. Further, pH of the electrolyte solution in the anodic compartment can be held above 2 to facilitate cobalt plating in downstream processing steps.

After sufficient oxidation and leaching of the metal impurities, the WC composition is removed from the anode compartment and is subjected to an acid wash to remove any contaminants and oxidized metal impurities. Acid used in the wash can be recycled to the anode and/or cathode compartment. The WC composition is subsequently washed and dried to provide the purified WC product. In some embodiments, the WC product has a purity selected from Table I herein. The electrolyte solution of the anode compartment is transferred to the cathode compartment. Removal and transfer of the electrolyte solution can be achieved with suitable pumping apparatus. In the cathode compartment, residual cobalt (III) is reduced to cobalt (II)

and cobalt (II) is plated out as cobalt metal. The remaining metal impurities of the electrolyte solution can be extracted by various downstream separation techniques.

EXAMPLES

Cerium Mediated WC Purification System

Figure 3:
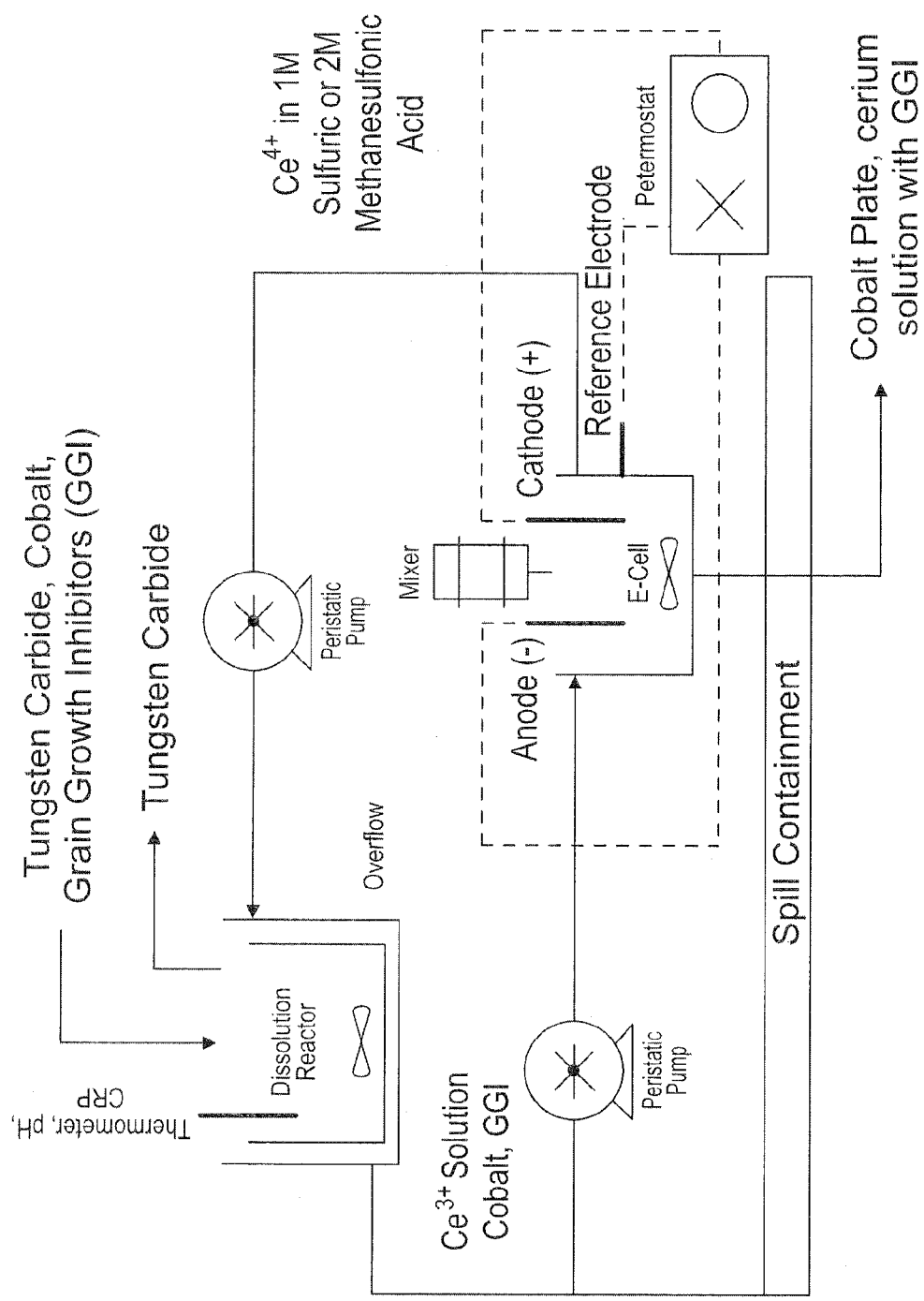
FIG. 3 is a schematic of a method and system employing cerium (IV) as the cationic metal oxidant in the purification of WC compositions according to one embodiment described herein.

FIG. 3 illustrates a method and system employing cerium (IV) as the cationic metal oxidant in the purification of WC compositions according to the following examples. The dissolution reactor was placed inside a larger beaker to allow gravity overflow of the electrolyte solution, the dissolution reactor being mixed with a stir bar. The electrolyte solution overflow from the dissolution reactor was transferred to the electrolytic cell by a pump. Temperature, pH and ORP were monitored in the dissolution reactor throughout the runs of WC purification at regular sample intervals. The electrolytic cell used for cobalt plating contained an impeller, dimensionally stabilized anode and stainless steel cathode. Cathode and anode were weighed before and after each WC purification run. The power supply maintained a constant amperage above 2 amp while the voltage was allowed to vary freely. The electrolyte solution containing the cerium (IV) oxidant was returned to the dissolution chamber by pumping apparatus, and all tubing in the system was Viton.

10 mL of electrolyte solution from the dissolution reactor was collected at 0 (fresh electrolyte), 60 and 120 minutes, 4 hours and 8 hours into each WC purification run. 10 mL of fresh electrolyte was added to the dissolution reactor after sampling. The purification system was then allowed to run and a sample taken at 24 hours. Electrolyte temperature, ORP and pH were recorded at each sampling. Voltage and current were recorded continuously. When removed from the electrolyte solution, the electrodes were rinsed with deionized water, air dried and weighed.

The general protocol for a WC purification run was as follows. Specific alterations of this general protocol are provided in the results summary for each WC purification run. The masses of the anode and cathode were recorded to ±0.1 mg. 1.5 liters of sulfuric acid electrolyte solution was prepared by adding 147 grams of sulfuric acid to 1.5 liters of high purity deionized water. The actual volume of water added to form the electrolyte solution can be adjusted according to the concentration of the sulfuric acid. About 15 g of cobalt heptahydrate was added to the sulfuric acid electrolyte and mixed to pre-load the electrolyte to about 2 g/L of cobalt to facilitate cobalt plating in the electrolytic cell. 10 g of cemented WC powder was weighed in a tared weigh boat to ±0.01 g. About 75 g of ceric sulfate was added to the sulfuric acid electrolyte and stirred until fully dissolved. The sulfuric acid electrolyte solution comprising cerium (IV) as the cationic oxidant was added to the dissolution reactor and the stir bar initiated. The speed of the stir bar was set such that mixing was sufficient to cause bulk movement of the cemented WC powder but insufficient to displace the cemented WC powder with the overflowing electrolyte. Electrolyte was allowed to overflow into the electrolytic cell and the pumping apparatus was initiated to return the electrolyte solution to the dissolution chamber from the electrolytic cell. The electrolytic cell should contain electrolyte solution in an amount sufficient to cover the electrodes. The potentiostat was turned on to monitor voltage and current, and the powder cemented WC composition was added to the dissolution chamber. Time of the addition was recorded for initiating the sampling intervals described above.

After completion of 24 hours of metal impurity oxidation/leaching, the WC composition was allowed to settle to the bottom of the dissolution reactor, and the electrolyte solution was carefully poured off with the WC composition remaining in the dissolution reactor. The dissolution reactor was refilled with 150 mL of 1M sulfuric acid and mixed for two minutes. The WC composition was allowed to settle in the dissolution reactor and the sulfuric acid poured off This procedure was repeated two additional times. The dissolution reactor was then filled with 150 mL of deionized water, mixed for two minutes and the pH recorded. The WC composition was allowed to settle and the water poured off This process was repeated until the pH of the DI water in contact with the WC composition was above 5.5. The water and WC composition were transferred to a vial and the water removed. The vial containing the WC composition was placed in recirculating air oven at 220° F. for 4 hours. The vial was removed from the oven and placed in a desiccator for 12 hours. The mass of the collected WC composition was recorded. A total of 5 WC composition purification runs were completed. The specific conditions and results of each run are provided below.

Titrations were also performed on each run to determine concentration of the cationic cerium oxidant in the electrolyte solution. Titrations were conducted as follows. 100 mg of ammonium ferrous hexahydrate were mixed with 500 mL of high purity deionized water and a few drops of ferroin indicator were added turning the solution red. The electrolyte solution sample was diluted by a factor of 10 by adding 10 mL of the electrolyte solution sample and the balance high purity deionized water to a 100 mL volumetric flask. The diluted electrolyte sample was added to a buret and the starting volume recorded. The electrolyte sample was added to the ammonium ferrous sulfate hexahydrate solution dropwise with mixing until the solution tuned pale blue. The cerium (IV) concentration in the electrolyte solution was calculated from the titration. At color change, approximately 0.255 mmol of cerium (IV) had been added.

WC Purification Run 1
Specific Conditions
1M sulfuric acid electrolyte
Run Time: 24 hours
Average electrolytic cell power draw: 2.4W
Cemented WC scrap added: 9.99 g
System Volume: 1.272 L
Cerium (IV) Concentration: 0.0422 mol/L
Initial Cobalt Concentration: 2 g/L
Cathode Mass Change: +0.0008 g
Anode Mass Change: −0.0013 g
Final Tungsten concentration in dissolution reactor: 178.56 mg/L
Results
Starting WC Purity: 86.7%
Ending WC Purity: 98.0%
Reduction in Co Binder and Grain Growth Inhibitors: 85%

TABLE II

Compositional Analysis of Cemented WC Composition of Run 1

| Element | % in Stating WC Material | % in Ending WC Material |
|---|---|---|
| Tantalum | None detected | 0.01 |
| Titanium | <0.01 | <0.01 |
| Niobium | <0.01 | <0.01 |
| Cobalt | 12.15 | 1.685 |
| Iron | 0.55 | 0.03 |
| Nickel | 0.04 | <0.01 |

TABLE II-continued

Compositional Analysis of Cemented WC Composition of Run 1

| Element | % in Stating WC Material | % in Ending WC Material |
|---|---|---|
| Chromium | 0.39 | 0.17 |
| Vanadium | 0.14 | 0.05 |
| Hafnium | <0.01 | 0.01 |
| Molybdenum | <0.001 | None detected |
| Zirconium | 0.02 | 0.02 |
| Zinc | 0 | 0.013 |
| Copper | 0 | None Detected |
| Silicon | 0.0295 | 0.004 |

WC Purification Run 2
Specific Conditions
1.5M sulfuric acid electrolyte
Run Time: 7 hours
Average electrolytic cell power draw: 5.2 W
Cemented WC scrap added: 9.99 g
System Volume: 1.295 L
Cerium (IV) Concentration: 0.0319 mol/L
Initial Cobalt Concentration: 2 g/L
Cathode Mass Change: +0.0001 g
Anode Mass Change: −0.0005 g
Final Tungsten concentration in dissolution reactor: 104 mg/L
Results
Starting WC Purity: 86.7%
Ending WC Purity: 98.2%
Reduction in Co Binder and Grain Growth Inhibitors: 86.5%

TABLE III

Compositional Analysis of Cemented WC Composition of Run 2

| Element | % in Stating WC Material | % in Ending WC Material |
|---|---|---|
| Tantalum | None detected | 0.02 |
| Titanium | <0.01 | <0.01 |
| Niobium | <0.01 | <0.01 |
| Cobalt | 12.15 | 1.495 |
| Iron | 0.55 | 0.035 |
| Nickel | 0.04 | 0.01 |
| Chromium | 0.39 | 0.165 |
| Vanadium | 0.14 | 0.06 |
| Hafnium | <0.01 | 0.01 |
| Molybdenum | <0.001 | None detected |
| Zirconium | 0.02 | 0.02 |
| Zinc | 0 | 0.013 |
| Copper | 0 | None Detected |
| Silicon | 0.0295 | 0.004 |

WC Purification Run 3
Specific Conditions
2.0M methanesulfonic acid electrolyte
Run Time: 6 hours
Average electrolytic cell power draw: 3.6 W
Cemented WC scrap added: 10.00 g
System Volume: 1.365 L
Cerium (IV) Concentration: 0.0318 mol/L
Initial Cobalt Concentration: 6 g/L
Cathode Mass Change: −0.0516 g
Anode Mass Change: +0.0065 g
Final Tungsten concentration in dissolution reactor: 385 mg/L
For Run 3, cerium (III) chloride was used for compatibility with the methanesulfonic acid electrolyte. Also, the cobalt source was cobalt chloride as opposed to cobalt sulfate used in purification Runs 1 and 2. The cerium (III) was oxidized in the undivided electrolytic cell to cerium (IV) prior to initiation of Run 3 and pumped into the dissolution reactor as illustrate in the schematic of FIG. 3.
Results
Starting WC Purity: 86.7%
Ending WC Purity: 97.4%
Reduction in Co Binder and Grain Growth Inhibitors: 80.5%

TABLE IV

Compositional Analysis of Cemented WC Composition of Run 3

| Element | % in Stating WC Material | % in Ending WC Material |
|---|---|---|
| Tantalum | None detected | 0.01 |
| Titanium | <0.01 | <0.01 |
| Niobium | <0.01 | <0.01 |
| Cobalt | 12.15 | 2.23 |
| Iron | 0.55 | 0.03 |
| Nickel | 0.04 | 0.01 |
| Chromium | 0.39 | 0.2 |
| Vanadium | 0.14 | 0.05 |
| Hafnium | <0.01 | 0.01 |
| Molybdenum | <0.001 | None detected |
| Zirconium | 0.02 | 0.02 |
| Zinc | 0 | 0.01 |
| Copper | 0 | None Detected |
| Silicon | 0.0295 | 0.0 |

WC Purification Run 4
Specific Conditions
0.22M sulfuric acid electrolyte
Run Time: 5 hours
Cemented WC scrap added: 10.65 g
System Volume: 1.378 L
Cerium (IV) Concentration: 0.0118 mol/L
Initial Cobalt Concentration: 1.6 g/L
Cathode Mass Change: +0.0365 g
Anode Mass Change: +0.0509 g
Tungsten concentration after 3.5 hours in dissolution reactor: 35 mg/L
Results
Starting WC Purity: 86.7%
Ending WC Purity: 94.5%
Reduction in Co Binder and Grain Growth Inhibitors: 58.6%

TABLE V

Compositional Analysis of Cemented WC Composition of Run 4

| Element | % in Stating WC Material | % in Ending WC Material |
|---|---|---|
| Tantalum | None detected | 0.01 |
| Titanium | <0.01 | <0.01 |
| Niobium | <0.01 | <0.01 |
| Cobalt | 12.15 | 4.98 |
| Iron | 0.55 | 0.04 |
| Nickel | 0.04 | 0.02 |
| Chromium | 0.39 | 0.25 |
| Vanadium | 0.14 | 0.10 |
| Hafnium | <0.01 | <0.01 |
| Molybdenum | <0.001 | None detected |
| Zirconium | 0.02 | 0.02 |
| Zinc | 0 | 0.01 |
| Copper | 0 | 0.01 |
| Silicon | 0.0295 | 0.02 |

WC Purification Run 5
Specific Conditions
0.33M sulfuric acid electrolyte
Run Time: 5 hours
Average electrolytic cell draw: 4.7 W
Cemented WC scrap added: 10.64 g
System Volume: 1 L Cerium (IV) Concentration: 0.0422 mol/L
Initial Cobalt Concentration: 6 g/L
Cathode Mass Change: +0.0080 g
Anode Mass Change: +0.0277 g
Final Tungsten concentration in dissolution reactor: 194 mg/L
Results
Starting WC Purity: 86.7%
Ending WC Purity: 95.7%
Reduction in Co Binder and Grain Growth Inhibitors: 67.7%

TABLE VI

Compositional Analysis of Cemented WC Composition of Run 5

| Element | % in Stating WC Material | % in Ending WC Material |
|---|---|---|
| Tantalum | None detected | 0.01 |
| Titanium | <0.01 | <0.01 |
| Niobium | <0.01 | <0.01 |
| Cobalt | 12.15 | 3.855 |
| Iron | 0.55 | 0.03 |
| Nickel | 0.04 | 0.015 |
| Chromium | 0.39 | 0.22 |
| Vanadium | 0.14 | 0.10 |
| Hafnium | <0.01 | <0.01 |
| Molybdenum | <0.001 | None detected |
| Zirconium | 0.02 | 0.02 |
| Zinc | 0 | 0.01 |
| Copper | 0 | 0.004 |
| Silicon | 0.0295 | 0.001 |

As evidenced by the foregoing five WC purification runs, methods described herein significantly improve the purity of WC compositions enabling direct use of such WC compositions in the production of new tooling.

Various embodiments of the invention have been described in fulfillment of the various objects of the invention. It should be recognized that these embodiments are merely illustrative of the principles of the present invention. Numerous modifications and adaptations thereof will be readily apparent to those skill in the art without departing from the spirit and scope of the invention.

That which is claimed is:

1. A method of purifying a tungsten carbide (WC) composition comprising:
   contacting the WC composition with an electrolyte solution comprising a cationic metal oxidant; and
   oxidizing one or more metal impurities of the WC composition with the cationic metal oxidant to solubilize the one or more metal impurities in the electrolyte solution.

2. The method of claim 1, wherein an oxidized metal impurity is selected from the group consisting of metallic elements of Groups IVB-VIIIB of the Periodic Table.

3. The method of claim 2, wherein the oxidized metal is selected from the group consisting of titanium, vanadium, zirconium, hafnium, niobium, tantalum, chromium, cobalt, nickel and iron.

4. The method of claim 2, wherein the oxidized metal is a metal carbide in the WC composition.

5. The method of claim 1, wherein the cationic metal oxidant is soluble in the electrolyte solution.

6. The method of claim 1, wherein the cationic metal oxidant is a transition metal or a lanthanide series element.

7. The method of claim 6, wherein the oxidant is cerium (IV).

8. The method of claim 6, wherein the oxidant is cobalt (III).

9. The method of claim 1, wherein oxidation of the one or more metal impurities by the cationic metal oxidant occurs in the absence of an electrode.

10. The method of claim 1, wherein oxidation of the one or metal impurities by the cationic metal oxidant occurs in the presence of an electrode.

11. The method of claim 10, wherein the electrode is a cathode.

12. The method of claim 10, wherein the electrode is an anode.

13. The method of claim 1 further comprising separating the WC composition from the electrolyte solution containing the one or more solubilized metal impurities to provide a purified WC product.

14. The method of claim 13, wherein the WC product is at least 95% pure.

15. The method of claim 13, wherein the WC product is at least 98% pure.

16. The method of claim 1 further comprising oxidizing the reduced metal oxidant for continued use of the metal oxidant in the oxidation of metal impurities remaining in the WC composition.

17. The method of claim 16, wherein the reduced metal oxidant is oxidized by an anode in contact with the electrolyte solution.

18. The method of claim 17, wherein the anode is positioned in a vessel separate from the WC composition, and electrolyte solution comprising the reduced metal oxidant is transferred to the vessel for oxidation.

19. The method of claim 18 further comprising returning the electrolyte solution comprising the metal oxidant to the WC composition for continued oxidation of the metal impurities remaining in the WC composition.

20. The method of claim 13, wherein the electrolyte solution is processed to capture the one or more solubilized metal impurities.

21. The method of claim 20, wherein cobalt is plated from the electrolyte solution.

22. The method of claim 13, wherein the cationic metal oxidant is recovered from the electrolyte solution.

23. The method of claim 1, wherein the WC composition is cemented WC.

24. The method of claim 1, wherein the WC composition is zinc treated WC scrap.

* * * * *